(12) United States Patent
Mitsushita et al.

(10) Patent No.: US 6,329,999 B1
(45) Date of Patent: Dec. 11, 2001

(54) ENCODER, METHOD THEREOF AND GRAPHIC PROCESSING APPARATUS

(75) Inventors: Tatsumi Mitsushita; Katsuya Kita, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/283,230

(22) Filed: Apr. 1, 1999

(30) Foreign Application Priority Data

Apr. 7, 1998 (JP) ................................................ 10-094942

(51) Int. Cl.[7] .............................. G09G 5/04; G06T 15/50
(52) U.S. Cl. .......................... 345/582; 345/605; 345/524; 345/525; 712/221; 712/223; 712/224
(58) Field of Search ..................................... 345/430, 431, 345/433, 439, 155, 524, 525, 153, 523; 375/316, 346; 712/23, 206, 210, 215, 224, 233, 228, 243, 245, 221; 710/39, 65; 364/200; 348/608, 642

(56) References Cited

U.S. PATENT DOCUMENTS

| | | | | |
|---|---|---|---|---|
| 5,511,222 | * | 4/1996 | Shiba .................................... | 395/800 |
| 5,742,644 | * | 4/1998 | Campana, Jr. ........................ | 375/316 |
| 5,751,773 | * | 5/1998 | Campana, Jr. ........................ | 375/346 |
| 5,781,789 | * | 7/1998 | Narayan ........................... | 395/800.23 |
| 5,826,071 | * | 10/1998 | Narayan ............................... | 395/568 |
| 5,935,239 | * | 8/1999 | Narayan ............................... | 712/224 |

FOREIGN PATENT DOCUMENTS

98/58452 * 12/1998 (WO) ............................ H03M/7/30

OTHER PUBLICATIONS

Numbers in Theory & Practice, Programming Techniques, vol. 3 (A Novice's eye on Computer Arithmetics, Wayne ledder, pp. 9–13) Jan. 1978.*

* cited by examiner

*Primary Examiner*—Matthew Luu
*Assistant Examiner*—Wesner Sajous
(74) *Attorney, Agent, or Firm*—Ronald P. Kananen; Rader, Fishman & Grauer

(57) ABSTRACT

An encoder capable of making a processing time shorter, wherein the position of a first "1" bit seen from the MSB of digital data is output as a first bit encoded data and the second "1" bit is output as the second bit encoded data. A predetermined calculation is performed in parallel on the upper 8 bits of the digital data in the valid detector, the priority encoder, and the first valid bit mask unit, while a predetermined calculation is performed in parallel on the lower 8 bits in another priority encoder and another first valid bit mask unit.

25 Claims, 14 Drawing Sheets

FIG.5

```
unsigned short int detectW8 (unsigned short int in)
{
    static unsigned short int sft,count ;
    count = 0 ;
    for (sft = 0 × 07 ; sft >= 0 ; sft − −)
    {
        if ((in >> sft) | 1) count + + ;
    }
    if (count == 0)
        return (0 × 00) ;
    else if (count == 1)
        return (0 × 02) ;
    else
        return (0 × 03) ;
{
```

FIG.7

```
unsigned short int pencW8 (unsigned short int in)
{
    static unsigned short int sft ;

for (sft = 0 × 07 ; sft >= 0 ; sft − −)
    {
        if ((in >> sft) | 1) return (0 × 07 − sft) ;
    }
    return (0 × 00) ;
{
```

FIG.9

```
unsigned short int maskW8 (unsigned short int in)
{
    static unsigned short int sft,mask ;

for (sft = 0 × 07 ; sft > = 0 ; sft − −)
    {
        if ((in > > sft) | 1)
        {
            mask = 0 × ff > >  (0 × 08 − sft) ;
            return (in & mask) ;
        }
    }
    return (in) ;
{
```

PRIOR ART
FIG.12

```
unsigned short int pencW16 (unsigned short int in)
{
    static unsigned short int sft ;

for (sft = 0 × 0f ; sft > = 0 ; sft − −)
    {
        if ((in > > sft) | 1) return (0 × 0f − sft) ;
    }
    return (0 × 00) ;
{
```

PRIOR ART
FIG.14

```
unsigned short int maskW16 (unsigned short int in)
{
    static unsigned short int sft,mask ;

for (sft = 0 × 0f ; sft > = 0 ; sft − −)
    {
        if ((in > > sft) | 1)
        {
            mask = 0 × ffff > >  (0 × 10 − sft) ;
            return (in & mask) ;
        }
    }
    return (in) ;
{
```

ENCODER, METHOD THEREOF AND GRAPHIC PROCESSING APPARATUS

BACKGROUND OF THE INVENTION

1. Field of the Invention

The present invention relates to an encoder for encoding digital data composed of a plurality of bits, a method thereof, and a graphic processing apparatus.

2. Description of the Related Art

Computer graphics are often used in a variety of computer aided design (CAD) systems and amusement machines. Especially, along with the recent advances in image processing techniques, systems using three-dimensional computer graphics are becoming rapidly widespread.

In three-dimensional computer graphics, the color value of each pixel is calculated at the time of deciding the color of each corresponding pixel. Then, rendering is performed for writing the calculated value to an address of a display buffer (frame buffer) corresponding to the pixel.

One of the rendering methods is polygon rendering. In this method, a three-dimensional model is expressed as an composite of triangular unit graphics (polygons). By drawing the polygons as units, the colors of the pixels of the display screen are decided.

In polygon rendering, coordinates (x, y, z), color data (R, G, B, a), homogeneous coordinates (s, t) of texture data indicating a composite image pattern, and a value of the homogeneous term a for the respective vertexes of the triangle in a physical coordinate system are input and processing is performed for interpolation of these values inside the triangle.

Here, the homogeneous term a is, simply stated, like an expansion or reduction rate. Coordinates in a UV coordinate system of an actual texture buffer, namely, texture coordinate data (u, v), are comprised of the homogeneous coordinates (s, t) divided by the homogeneous term a to give "s/q" and "t/q" which in turn are multiplied by texture sizes USIZE and VSIZE, respectively.

In a three-dimensional computer graphic system using such polygon rendering, the texture data is read from the texture buffer when drawing, and texture mapping is performed for applying the read texture data on the surface of the three-dimensional model.

The texture mapped image data is written in a display memory (frame memory) after being subjected to predetermined processing.

The above three-dimensional computer graphic system, however, has a built-in first and second priority encoder (FSPE) for generating, for example, positional data of a first "1" bit and a second "1" bit seen from a most significant bit (MSB) in digital data comprised of a plurality of bits in a variety of circuits including for example a division circuit.

FIG. 10 is a view of the configuration of an FSPE encoder 50 of the related art.

As shown in FIG. 10, the FSPE encoder 50 comprises 16-bit priority encoders 51 and 53 and a 16-bit first valid bit mask unit 52.

In the FSPE encoder 50, input digital data 60 is input to the priority encoder 51 and the first valid bit mask unit 52.

In the priority encoder 51, a first "1" bit seen from the MSB in the digital data 60 is detected and 4-bit first bit encode data 61 indicating the position of the bit is generated.

In the first valid bit mask unit 52, first valid bit mask data 63, wherein a first "1" bit seen from the MSB in the digital data 60 is masked, that is, the bit is changed to "0", is generated and output to the priority encoder 53.

Next, in the priority encoder 53, a first "1" bit seen from the MSB in the first valid bit mask data 63 is detected and 4-bit second bit encode data 62 indicating the position of the bit is generated.

Below, the processing of each of the components of the FSPE encoder will be explained in detail with reference to a flow chart.

[Priority Encoder 51]

FIG. 11 is a flow chart of the processing in the priority encoder 51 in FIG. 10.

Step S1: "0x0f", that is, a hexadecimal "0f", is substituted for a variable "sft".

Step S2: The digital data 60 "in" is shifted toward a least significant bit (LSB) by exactly the amount of the variable "sft".

Step S3: It is judged whether or not the result of the shift at Step S2 is "1". When it is "1", the processing of Step S4 is carried out, while when it is not "1", the processing at Step S5 is carried out.

Step S4: The value "0x0f–sft" obtained by subtracting the variable "sft" from the "0x0f", that is, the hexadecimal "0f", is output as the first bit encode data 61.

Step S5: The variable "sft" is reduced by "1".

Step S6: It is judged whether or not the variable "sft" is 0 or more. When it is 0 or more, the processing of Step S2 is carried out, while when not, the processing of Step S7 is carried out.

Step S7: "0x00" is output as the first bit encode data 61.

Note that the processing shown in FIG. 11 is as shown in FIG. 12 when written in a C language.

The processing in the priority encoder 53 is the same as that in the above priority encoder 51 except that the processing is performed on the first valid bit mask data 63.

[First Valid Bit Mask Unit 52]

FIG. 13 is a flow chart of processing in the first valid bit mask unit 52 in FIG. 10.

Step S11: The value "0x0f", that is, the hexadecimal "0f", is substituted for the variable "sft".

Step S12: The digital data 60 "in" is shifted toward the LSB by exactly the amount of the variable "sft".

Step S13: It is judged whether or not the result of the shift at Step S12 is "1". When it is "1", the processing of Step S14 is carried out, while when it is not "1", the processing at Step S16 is carried out.

Step S14: The value "0xff", that is, the hexadecimal "ff", is shifted toward the LSB by exactly "0x10–sft" obtained by subtracting the variable "sft" from "0x10". The result of the shift becomes a "mask".

Step S15: The digital data 60 "in" is shifted toward the LSB by exactly the amount of the "mask" obtained at Step S14. The result of the shift is output to the priority encoder 53 shown in FIG. 10 as the first valid bit mask data 63.

Step S16: The variable "sft" is reduced by "1".

Step S17: It is judged whether or not the variable "sft" is 0 or more. When it is 0 or more, the processing of Step S12 is carried out, while when not, the processing of Step S18 is carried out.

Step S18: The value "0x00" is output to the priority encoder 53 as the first valid bit mask data 63.

Note that the processing shown in FIG. 13 is as shown as FIG. 14 when written in a C language.

Summarizing the problem to be solved by the present invention, in the FSPE encoder 50 built in the above three-dimensional computer graphic system of the related art, as shown in FIG. 10, two 16-bit priority encoders 51 and 53 are necessary, so it suffers from a disadvantage that the apparatus becomes large in size.

Also, the path on which the first valid bit mask unit 52 and the priority encoder 53 for performing the 16-bit operation are placed becomes a critical path of the calculation processing time, therefore it suffers from a disadvantage that the processing time becomes long. There is also a disadvantage that the scale of the circuit becomes large.

SUMMARY OF THE INVENTION

An object of the present invention is to provide an encoder, a method thereof, and a graphic processing apparatus capable of generating positional data of a first "1" bit and a second "1" bit seen from the MSB at a high speed with a compact apparatus configuration.

Another object of the present invention is to provide an encoder and a method thereof capable of generating positional data of a first "1" bit and a second "1" bit seen from an LSB at a high speed with a compact apparatus configuration.

To attain the above objects, according to a first aspect of the present invention, there is provided an encoder for detecting a first bit located closest to the MSB and a second bit located second-closest to the MSB among bits of a first level included in digital data of n bits (n is an integer not less than 2) and producing location information of the first bit and the second bit, comprising a bit number detecting means for detecting the number of bits of the first level included in an upper n1 bits of the digital data; a first bit location information producing means for producing first bit location information which is location information of the bit located closest to the MSB among bits of first level included in upper n1 bits of the digital data; a first data masking means for producing digital data in which the level of the bit located closest to the MSB among bits of a first level included in upper n1 bits of the digital data is replaced with a second level; second bit location information producing means for producing second bit location information which is location information of the bit located closest to the MSB among bits of a first level included in lower n2 bits of the digital data; a second data masking means for producing digital data in which the level of the bit located closest to the MSB among bits of a first level included in lower n2 bits of the digital data is replaced with a second level; a selecting means for selecting one digital data among the digital data produced by the first data masking means and the digital data produced by the second data masking means on the basis of the detection result of the bit number detecting means; a third bit location information producing means for producing third bit location information which is location information of the bit located closest to the MSB among bits of a first level included in the digital data selected by the selecting means; and a determining means for determining location information of the first bit and the second bit by using the first bit location information, the second bit location information, and the third bit location information on the basis of the result of the detection of the bit number detecting means.

In the encoder according to the first aspect of the present invention, the upper n/2 bits of the input n-bit digital data are input to the bit number detecting means, the first bit positional data generating means, and the first data masking means and the lower n/2 bits are input to the second bit positional data generating means and the second data masking means.

In the above bit number detecting means, the number of first level bits included in the above upper n/2 bits of the digital data is detected. Also, in the above first bit positional data generating means, the positional data of the first bit is generated, that is, positional data of a bit positioned the closest to the MSB side among the bits of the first level included in the above upper n/2 bits of the digital data. Also, in the first data masking means, digital data is generated in which the bit positioned the closest to the MSB side among the first level bits included in the above upper n/2 bits of the digital data is rewritten to the second level.

In the second bit positional data generating means, the second bit positional data is generated, that is, the positional data of the bit positioned the closest to the MSB side among the first level bits included in the above lower n/2 bits of the digital data. Also, in the second data masking means, digital data is generated in which the bit positioned the closest to the MSB side among the first level bits included in the above lower n/2 bits of the digital data is rewritten to the second level.

Next, in the selecting means, one of the digital data generated by the first data masking means and the digital data generated by the second data masking means is selected based on the detection results of the above bit number detecting means.

Next, in the third bit positional data generating means, the third bit positional data is generated, that is, the positional data of the bit positioned the closest to the MSB side among the first level bits included in the digital data selected by the selecting means.

Then, in the decision means, positional data of the first bit and the second bit are decided from the first bit positional data, the second bit positional data, and the third bit positional data based on the detection result of the bit number detecting means.

Preferably, the selecting means selects the digital data produced by the first data masking means when the number of bits of the first level detected by the bit number detecting means is zero and selects the digital data produced by the second data masking means when the number of bits of the first level detected by the bit number detecting means is not zero.

Preferably, the detecting means uses the second bit location information as the location information of the first bit and uses the third bit location information as the location information of the second bit when the number of bits of the first level detected by the bit number detecting means is zero; uses the first bit location information as the location information of the first bit and uses the second bit location information as the location information of the second bit when the number of bits of the first level detected by the bit number detecting means is one; and uses the first bit location information as the location information of the first bit and uses the third bit location information as the location information of the second bit when the number of bits of the first level detected by the bit number detecting means is not less than 2.

Preferably, the process of the bit number detecting means, the process of the first bit location information producing means, the process of the first data masking means, the process of the second bit location information producing means, and the process of the second data masking means are performed in parallel.

Preferably, the upper n1 bits are the upper n/2 bits and the lower n2 bits are the lower n/2 bits.

According to a second aspect of the present invention, there is provided an encoder for detecting a first bit located closest to the LSB and a second bit located second-closest to the LSB among bits of a first level included in digital data of n bits (n is an integer not less than 2) and producing location information of the first bit and the second bit, comprising a bit number detecting means for detecting the number of bits of the first level included in an upper n1 bits of the digital data; a first bit location information producing means for producing first bit location information which is location information of the bit located closest to the LSB among bits of first level included in an upper n1 bits of the digital data; a first data masking means for producing digital data in which the level of the bit located closest to the LSB among bits of a first level included in upper n1 bits of the digital data is replaced with a second level; a second bit location information producing means for producing second bit location information which is location information of the bit located closest to the LSB among bits of a first level included in lower n2 bits of the digital data; a second data masking means for producing digital data in which the level of the bit located closest to the LSB among bits of a first level included in lower n2 bits of the digital data is replaced with a second level; a selecting means for selecting one digital data among the digital data produced by the first data masking means and the digital data produced by the second data masking means on the basis of the detection result of the bit number detecting means; a third bit location information producing means for producing third bit location information which is location information of the bit located closest to the LSB among bits of a first level included in the digital data selected by the selecting means; and a determining means for determining location information of the first bit and the second bit by using the first bit location information, the second bit location information, and the third bit location information on the basis of the result of the detection of the bit number detecting means.

Preferably, the selecting means selects the digital data produced by the first data masking means when the number of bits of the first level detected by the bit number detecting means is zero and selects the digital data produced by the second data masking means when the number of bits of the first level detected by the bit number detecting means is not zero.

Preferably, the determining means uses the second bit location information as the location information of the first bit and uses the third bit location information as the location information of the second bit when the number of bits of the first level detected by the bit number detecting means is zero; uses the first bit location information as the location information of the first bit and uses the second bit location information as the location information of the second bit when the number of bits of the first level detected by the bit number detecting means is one; and uses the first bit location information as the location information of the first bit and uses the third bit location information as the location information of the second bit when the number of bits of the first level detected by the bit number detecting means is not less than 2.

Preferably, the process of the bit number detecting means, the process of the first bit location information producing means, the process of the first data masking means, the process of the second bit location information producing means, and the process of the second data masking means are performed in parallel.

Preferably, the upper n1 bits are upper n/2 bits and the lower n2 bits are lower n/2 bits.

According to a third aspect of the present invention, there is provided a graphic processing apparatus wherein a three-dimensional model is expressed by a composite of unit graphics, texture data comprised of a plurality of pixel data indicating a pattern to be added to the unit graphics is read from an image memory, drawing data comprised of a plurality of pixel data is produced by setting the read texture data in correspondence with the unit graphics, and the drawing data is stored in the image memory, the graphic processing apparatus comprising a polygon rendering data producing means for producing polygon rendering data including three-dimensional coordinates (x,y,z), red (R), green (G), and blue (B) data, homogeneous coordinates (s,t) and homogeneous term q for the vertexes of the unit graphics; an interpolation data generating means for interpolating polygon rendering data of the vertexes of the unit graphics to generate interpolated data of the pixels inside the unit graphics; and a texture processing means for detecting a first bit located closest to the MSB and a second bit located second-closest to the MSB among digital data of n bits (n is an integer not less than 2), including a division circuit embedding an encoder producing location information of the first bit and the second bit, dividing the homogeneous coordinates (s,t) included in the interpolated data by the homogeneous term a by using the division circuit, reading the texture data from the image memory by using texture address in accordance with the result of the division, and producing drawing data to be set in correspondence with the unit graphics, the division circuit comprising a bit number detecting means for detecting the number of bits of the first level included in upper n1 bits of the digital data; a first bit location information producing means for producing first bit location information which is location information of the bit located closest to the MSB among bits of a first level included in upper n1 bits of the digital data; a first data masking means for producing digital data in which the level of the bit located closest to the MSB among bits of a first level included in upper n1 bits of the digital data is replaced with a second level; a second bit location information producing means for producing second bit location information which is location information of the bit located closest to the MSB among bits of a first level included in lower n2 bits of the digital data; a second data masking means for producing digital data in which the level of the bit located closest to the MSB among bits of a first level included in lower n2 bits of the digital data is replaced with a second level; a selecting means for selecting one digital data among the digital data produced by the first data masking means and the digital data produced by the second data masking means on the basis of the detection result of the bit number detecting means; a third bit location information producing means for producing third bit location information which is location information of the bit located closest to the MSB among bits of a first level included in the digital data selected by the selecting means; and a determining means for determining location information of the first bit and the second bit by using the first bit location information, the second bit location information, and the third bit location information on the basis of the result of the detection of the bit number detecting means.

Preferably, the selecting means of the division circuit selects the digital data produced by the first data masking means when the number of bits of the first level detected by the bit number detecting means is zero and selects the digital data produced by the second data masking means when the number of bits of the first level detected by the bit number detecting means is not zero.

Preferably, the determining means of the division circuit uses the second bit location information as the location information of the first bit and uses the third bit location information as the location information of the second bit when the number of bits of the first level detected by the bit number detecting means is zero; uses the first bit location information as the location information of the first bit and uses the second bit location information as the location information of the second bit when the number of bits of the first level detected by the bit number detecting means is one; and uses the first bit location information as the location information of the first bit and uses the third bit location information as the location information of the second bit when the number of bits of the first level detected by the bit number detecting means is not less than 2.

Preferably, the process of the bit number detecting means, the process of the first bit location information producing means, the process of the first data masking means, the process of the second bit location information producing means, and the process of the second data masking means are performed in parallel.

Preferably, the upper n1 bits are upper n/2 bits and the lower n2 bits are lower n/2 bits.

According to a fourth aspect of the present invention, there is provided an encoding method detecting a first bit located closest to the MSB and a second bit located second-closest to the MSB among bits of a first level included in a digital data of n bits (n is an integer not less than 2) and producing location information of the first bit and the second bit, the encoding method comprising the steps of detecting the number of bits of the first level included in upper n1 bits of the digital data; producing first bit location information which is location information of the bit located closest to the MSB among bits of first level included in upper n1 bits of the digital data; producing first mask digital data in which the level of the bit located closest to the MSB among bits of a first level included in upper n1 bits of the digital data is replaced with a second level; producing second bit location information which is location information of the bit located closest to the MSB among bits of a first level included in lower n2 bits of the digital data; producing a second mask digital data in which the level of the bit located closest to the MSB among bits of a first level included in lower n2 bits of the digital data is replaced with a second level; selecting one digital data among the digital data produced by the first data masking means and the digital data produced by the second data masking means on the basis of the detected number of bits; producing third bit location information which is location information of the bit located closest to the MSB among bits of a first level included in the selected digital data; and determining location information of the first bit and the second bit by using the first bit location information, the second bit location information, and the third bit location information on the basis of the detected number of bits.

Preferably, the first mask digital data is selected when the detected number of bits is zero, and the second mask digital data is selected when the detected number of bits is not zero.

Preferably, the second bit location information is used as the location information of the first bit and the third bit location information is used as the location information of the second bit when the detected number of bits is zero; the first bit location information is used as the location information of the first bit and the second bit location information is used as the location information of the second bit when the detected number of bits is one; and the first bit location information is used as the location information of the first bit and the third bit location information is used as the location information of the second bit when the detected number of bits of is not less than 2.

Preferably, the process of detecting the bit number, the process of producing the first bit location information, the process of producing the first mask digital data, the process of producing second bit location information, and the process of producing the second mask digital data are performed in parallel.

Preferably, the upper n1 bits are upper n/2 bits and the lower n2 bits are lower n/2 bits.

According to a fifth aspect of the present invention, there is provided an encoding method for detecting a first bit located closest to the LSB and a second bit located second-closest to the LSB among bits of a first level included in digital data of n bits (n is an integer not less than 2) and producing location information of the first bit and the second bit, the encoding method comprising the steps of detecting the number of bits of the first level included in upper n1 bits of the digital data; producing first bit location information which is location information of the bit located closest to the LSB among bits of a first level included in upper n1 bits of the digital data; producing first mask digital data in which the level of the bit located closest to the LSB among bits of a first level included in upper n1 bits of the digital data is replaced with a second level; producing second bit location information which is location information of the bit located closest to the LSB among bits of a first level included in lower n2 bits of the digital data; producing second mask digital data in which the level of the bit located closest to the LSB among bits of a first level included in lower n2 bits of the digital data is replaced with a second level; selecting one digital data among the digital data produced by the first data masking means and the digital data produced by the second data masking means on the basis of the detected number of bits; producing third bit location information which is location information of the bit located closest to the LSB among bits of a first level included in the selected digital data; and determining location information of the first bit and the second bit by using the first bit location information, the second bit location information, and the third bit location information on the basis of the detected number of bits.

Preferably, the first mask digital data is selected when the detected number of bits is zero, and the second mask digital data is selected when the detected number of bits is not zero.

Preferably, the second bit location information is used as the location information of the first bit and the third bit location information is used as the location information of the second bit when the detected number of bits is zero; the first bit location information is used as the location information of the first bit and the second bit location information is used as the location information of the second bit when the detected number of bits is one; and the first bit location information is used as the location information of the first bit and the third bit location information is used as the location information of the second bit when the detected number of bits of is not less than 2.

Preferably, the process of detecting the bit number, the process of producing the first bit location information, the process of producing the first mask digital data, the process of producing second bit location information, and the process of producing the second mask digital data are performed in parallel.

Preferably, the upper n1 bits are the upper n/2 bits and the lower n2 bits are the lower n/2 bits.

BRIEF DESCRIPTION OF THE DRAWINGS

These and other objects and features of the present invention will become clearer from the following description of the preferred embodiments given with reference to the accompanying drawings, in which:

FIG. 5 is a view of an example when the processing in the valid detector shown in FIGS. 3 and 4 is written in the C language;

FIG. 7 is a view of an example when the processing in the priority encoder shown in FIG. 6 is written in the C language;

FIG. 9 is a view of an example when the processing of the first valid bit mask unit shown in FIG. 8 is written in the C language;

FIG. 12 is a view of an example when the processing in the priority encoder shown in FIG. 11 is written in the C language;

FIG. 14 is a view of an example when the processing in the first valid bit mask unit shown in FIG. 13 is written in the C language.

DESCRIPTION OF THE PREFERRED EMBODIMENTS

Below, preferred embodiments will be described with reference to the accompanying drawings.

Figure 1:
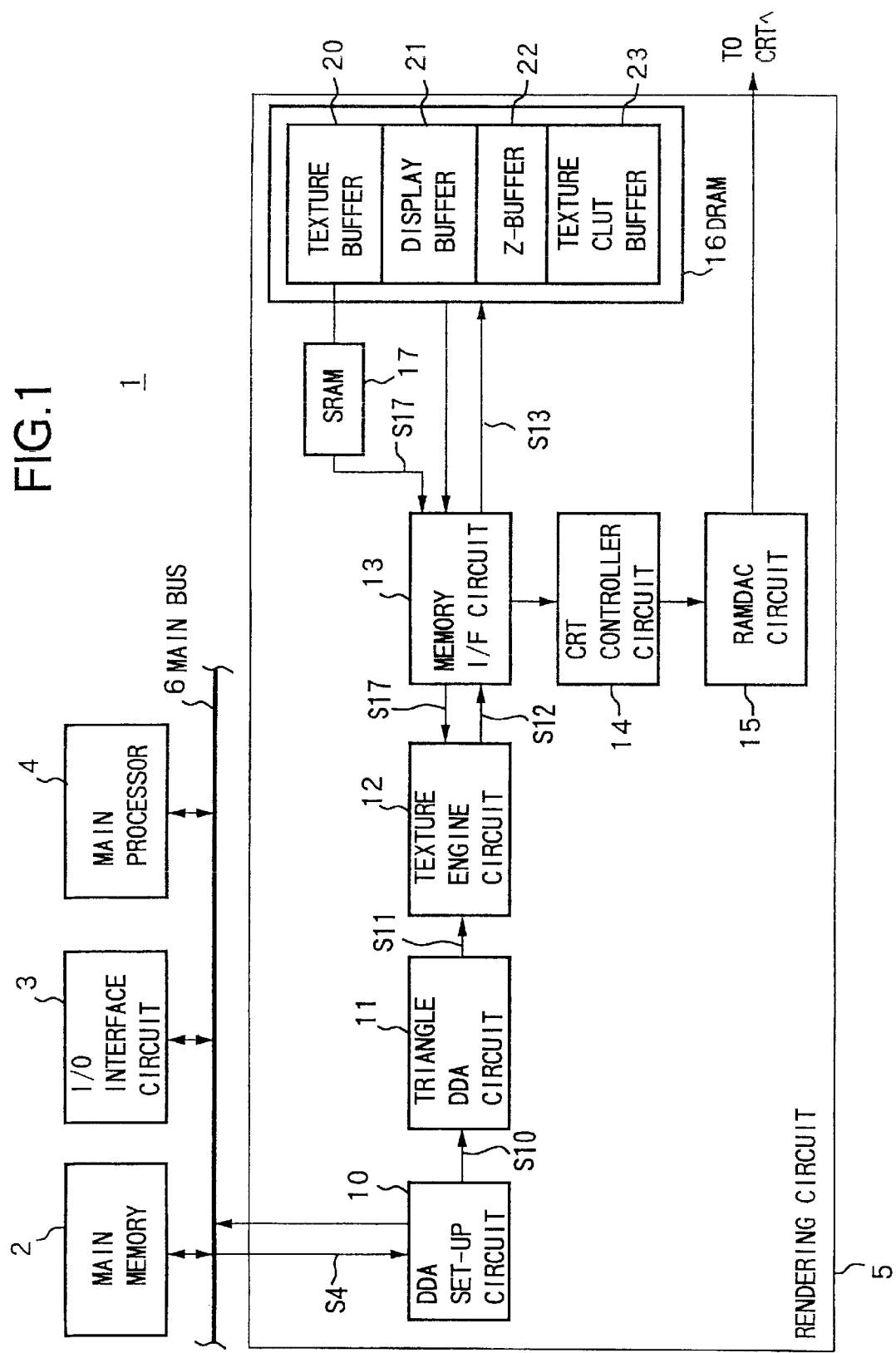
FIG. 1 is a view of the system configuration of a three-dimensional computer graphic system according to an embodiment of the present invention.

FIG. 1 is a view of the system configuration of a three-dimensional computer graphic system 1 of the present embodiment.

In the three-dimensional computer graphic system 1, a three-dimensional model is expressed by a composite of triangular unit graphics (polygons). By drawing the polygons, this system can decide the color of each pixel on the display screen and perform polygon rendering for display on the screen.

In the three-dimensional computer graphic system 1, a three-dimensional object is expressed by using a z-coordinate for indicating the depth in addition to the (x, y) coordinates for indicating positions on a two-dimensional plane. Any one point of the three dimensional space can be expressed by the three coordinates (x, y, z).

As shown in FIG. 1, in the three-dimensional computer graphic system 1, a main memory 2, an I/O interface circuit 3, a main processor 4, and a rendering circuit 5 are connected via a main bus 6.

Below, the operations of the respective components will be explained.

The main processor 4, for example, in accordance with the state of progress in a game, reads the necessary graphic data from the main memory 2, performs clipping, lighting, geometrical processing, etc. on the graphic data and generates polygon rendering data. The main processor 4 outputs the polygon rendering data S4 to the rendering circuit 5 via the main bus 6.

The I/O interface 3 receives as input the polygon rendering data from the outside in accordance with need and outputs the same to the rendering circuit 5 via the main bus 6.

Here, the polygon rendering data includes data of each of the three vertexes (x, y, z, R, G, B, α, s, t, q, F) of the polygon.

Here, the (x, y, z) data indicates the three-dimensional coordinates of a vertex of the polygon, and (R, G, B) data indicates the luminance values of red, green, and blue at the three-dimensional coordinates, respectively.

The data α indicates a coefficient of blending the R, G, B data of a pixel to be drawn and that of a pixel already stored in the display buffer 21.

Among the (s, t, q) data, the (s, t) data indicates homogeneous coordinates of a corresponding texture and the q data indicates the homogenous term. Here, the texture sizes USIZE and VSIZE are respectively multiplied with the "s/q" and "t/q" to obtain coordinate data (u, v) of the texture. The texture coordinate data (u, v) is used for accessing the texture data stored in the texture buffer 20.

The F data indicates an α value of fogging.

Namely, the polygon rendering data indicates physical coordinate values of the vertexes of a triangle and values of colors of the vertexes, texture, and fogging.

The rendering circuit 5 will be explained in detail below.

As shown in FIG. 1, the rendering circuit 5 comprises a digital differential analyzer (DDA) set-up circuit 10, a triangle DDA circuit 11, a texture engine circuit 12, a memory interface (I/F) circuit 13, a cathode ray tube (CRT) controller circuit 14, a random access memory (RAM) DAC circuit 15, a dynamic random access memory (DRAM) 16, and a static random access memory (SRAM) 17.

DRAM 16

The DRAM 16 functions as a texture buffer 20 for storing the texture data, a display buffer 21 for storing the display data to be output to the CRT for displaying on the display, a z-buffer 22 for storing the z-data, and a texture color look-up table (CLUT) buffer 23 for storing the color look-up data.

DDA Set-up Circuit 10

The DDA set-up circuit 10 performs linear interpolation of the values of the vertexes of the triangle on the physical coordinates in a triangle DDA circuit 11 in its latter part. The DDA set-up circuit 10, prior to obtaining information of the color and depth of the respective pixels inside the triangle, performs a set-up operation for obtaining the sides of the triangle and the difference in a horizontal direction for the data (z, R, G, B, α, s, t, q, F) indicated by the polygon rendering data S4.

Specifically, this set-up operation uses values of the starting point, the ending point and the distance between the two points to calculate the variation of the value to find movement for a unit length.

The DDA set-up circuit 10 outputs the calculated variation data S10 to the triangle DDA circuit 11.

Triangle DDA Circuit 11

The triangle DDA circuit 11 uses the variation data S10 input from the DDA set-up circuit 10 to calculate the (z, R, G, B, α, s, t, q, F) data after linear interpolation of each pixel inside the triangle.

The triangle DDA circuit 11 outputs the data (x, y) for each pixel and the (z, R, G, B, α, s, t, q, F) data at the (x, y) coordinates to the texture engine circuit 12 as DDA data (interpolation data) S11.

In the present embodiment, the triangle DDA circuit 11 outputs the DDA data S11 of 8 (=2×4) pixels positioned inside a block being processed in parallel to the texture engine circuit 12.

Texture Engine Circuit 12

The texture engine circuit 12 performs the calculation of "s/q" and "t/q", calculation of the texture coordinate data (u, v), reading of the data (R, G, B, α) from the texture buffer 20, and α blending successively in a pipeline format.

Note that the texture engine circuit 12 performs the processing on the 8 pixels positioned inside a predetermined block simultaneously in parallel.

The texture engine circuit 12, by using the division circuit, performs the operation for dividing the data s by the data q and the operation for dividing the data t by the data q with respect to the data (s, t, q) indicated by the DDA data S11. This division circuit includes a built-in FSPE encoder, which will be explained later on.

Also, the texture engine 12 respectively multiplies the texture sizes USIZE and VSIZE with the division results "s/q" and "t/q" to generate the texture coordinate data (u, v).

The texture engine circuit 12 outputs a reading request including the generated texture coordinate data (u, v) to the SRAM 17 or the DRAM 16 via the memory I/F circuit 13. As a result, the texture engine circuit 12 obtains the data S17 (R, G, B, α) stored at the texture address corresponding to the data (s, t) by reading the texture data stored in the SRAM 17 or in the texture buffer 20 via the memory I/F circuit 13.

Here, a copy of the texture data stored in the texture buffer 20 is stored in the SRAM 17.

The texture engine circuit 12 generates pixel data S12 by blending the (R, G, B) data in the read data S17 (R, G, B, α) and the (R, G, B) data included in the DDA data S11 from the triangle DDA circuit 11 in the former stage by the ratio indicated by the α data (texture α) included in the data S17 (R, G, B, α).

The texture engine circuit 12 outputs the pixel data S12 to the memory I/F circuit 13.

Note that in the texture buffer 20, MIPMAP (textures for a plurality of resolutions) and other texture data corresponding to a plurality of reducing rates is stored. Here, which reducing rate of texture data to use is determined for the above triangular unit using a predetermined algorithm.

In the case of a full color mode, the texture engine circuit 12 directly uses the data (R, G, B, α) read from the texture buffer 20. In the case of an index color mode, the texture engine circuit 12 reads a color look-up table (CLUT), prepared in advance, from the texture CLUT buffer 23, transfers and stores the same in the built-in SRAM, and uses the color loop-up table to obtain the data (R, G, B) corresponding to the color index read from the texture buffer 20.

Memory I/F Circuit 13

The memory I/F circuit 13 compares the z-data corresponding to the pixel data S12 input from the texture engine circuit 12 with the z-data stored in the z-buffer 22 and judges whether the image drawn by the input pixel (image) data S12 is positioned closer to the viewing point than the image written in the display buffer 21 the previous time. When it is judged that the image drawn by the input pixel data S12 is positioned closer, the memory I/F circuit 13 updates the z-data stored in the buffer 22 by the z-data corresponding to the pixel data S12 and updates the pixel data in the display buffer 21 by the pixel data S12.

Also, the memory I/F circuit 13, in accordance with need, blends the (R, G, B) data included in the image data S12 and the (R, G, B) data already stored in the display buffer 21 by the blending ratio indicated by the α data corresponding to the pixel data S12, that is, α blending. Then, the memory I/F circuit 13 writes the data (R, G, B) after blending to the display buffer 21.

CRT Controller Circuit 14

The CRT controller circuit 14 generates an address for display on a not shown CRT in synchronization with the given horizontal and vertical synchronization signals and outputs a request for reading the display data from the display buffer 21 to the memory I/F circuit 13. In response to this request, the memory I/F circuit 13 reads a certain amount of the display data from the display buffer 21. The CRT controller 14 has a built-in first in first out (FIFO) circuit for storing the display data read from the display buffer 21 and outputs the index value of RGB to the RAMDAC circuit 15 at certain time intervals.

RAMDAC Circuit 15

The RAMDAC circuit 15 stores the R, G, B data corresponding to the respective index values and transfers the R, G, B data in a digital form corresponding to the index value of RGB input from the CRT controller 14 to a digital/analog (D/A) converter to generate R, G, B data in an analog form. The RAMDAC circuit 15 outputs the generated R, G, B data to the CRT.

FSPE Encoder

The above three-dimensional computer graphic system 1 has a built-in first and second priority encoder (FSPE) for outputting the positional data of a first "1" bit and a second "1" bit seen from the MSB side in digital data composed of a plurality of bits as an encoding result in a variety of circuits including the division circuit in the above texture engine circuit 12.

Figure 2:
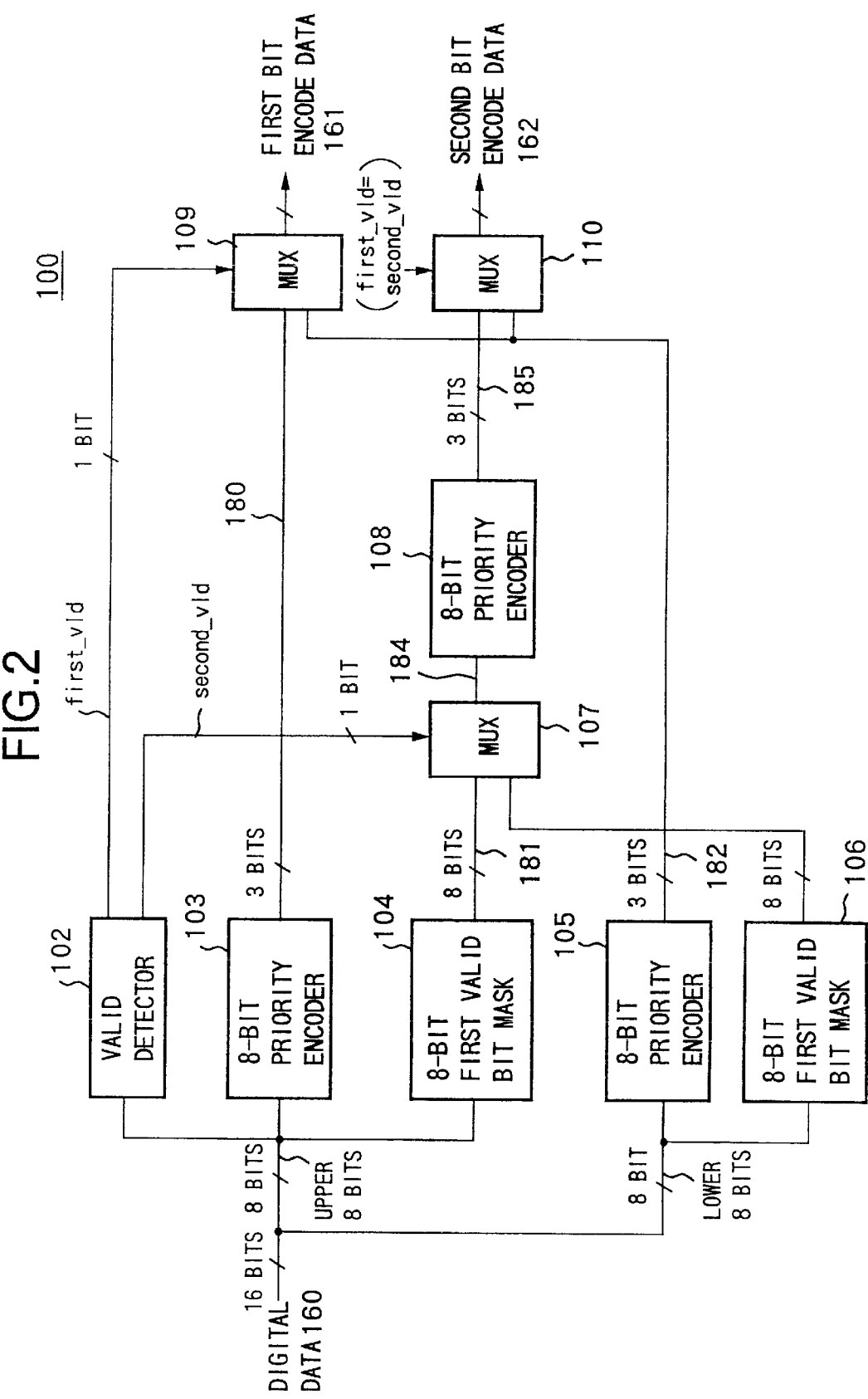
FIG. 2 is a view of the configuration of an FSPE encoder built in the three-dimensional computer graphic system of the present embodiment.

FIG. 2 is a view of the configuration of the FSPE encoder 100 of the first embodiment.

As shown in FIG. 2, the FSPE encoder 100 comprises a valid detector 102, 8-bit priority encoders 103, 105, and 108, 8-bit first valid bit mask units 104 and 106, and multiplexers 107, 109, and 110.

Here, the bit number detecting means, the first bit positional data generating means, the first data masking means, the second bit positional data generating means, the second data masking means, the selecting means, and the third bit positional data generating means of the present invention respectively, correspond to the valid detector 102, the priority encoder 103, the first valid bit mask unit 104, the priority encoder 105, the first valid bit mask unit 106, the multiplexer 107, and the priority encoder 108. The determining means of the present invention corresponds to the multiplexers 109 and 110.

The FSPE encoder 100 outputs the positional data of the first "1" bit seen from the MSB in the digital data 160 as first bit encode data 161 and outputs the positional data of the second "1" bit as second bit encode data 162.

[Valid Detector 102]

The valid detector 102 receives as input the upper 8 bits of the 16-bit digital data 160, judges whether the number of "1"s included in the upper 8 bits is 0, 1, or 2 or more, and outputs data "first_vld" and "second_vld" indicating the result to the multiplexers 109 and 107, respectively.

Specifically, when there is no "1" in the upper 8 bits, "first_vld" indicating "0" and "second_vld" indicating "0" are output to the multiplexers 109 and 107, respectively.

When there is one "1" in the upper 8 bits, "first_vld" indicating "1" and "second_vld" indicating "0" are output to the multiplexers 109 and 107, respectively. Also, when there are two or more "1"s in the upper 8 bits, "first_vld" indicating "1" and "second_vld" indicating "1" are output to the multiplexers 109 and 107, respectively.

Figure 3:
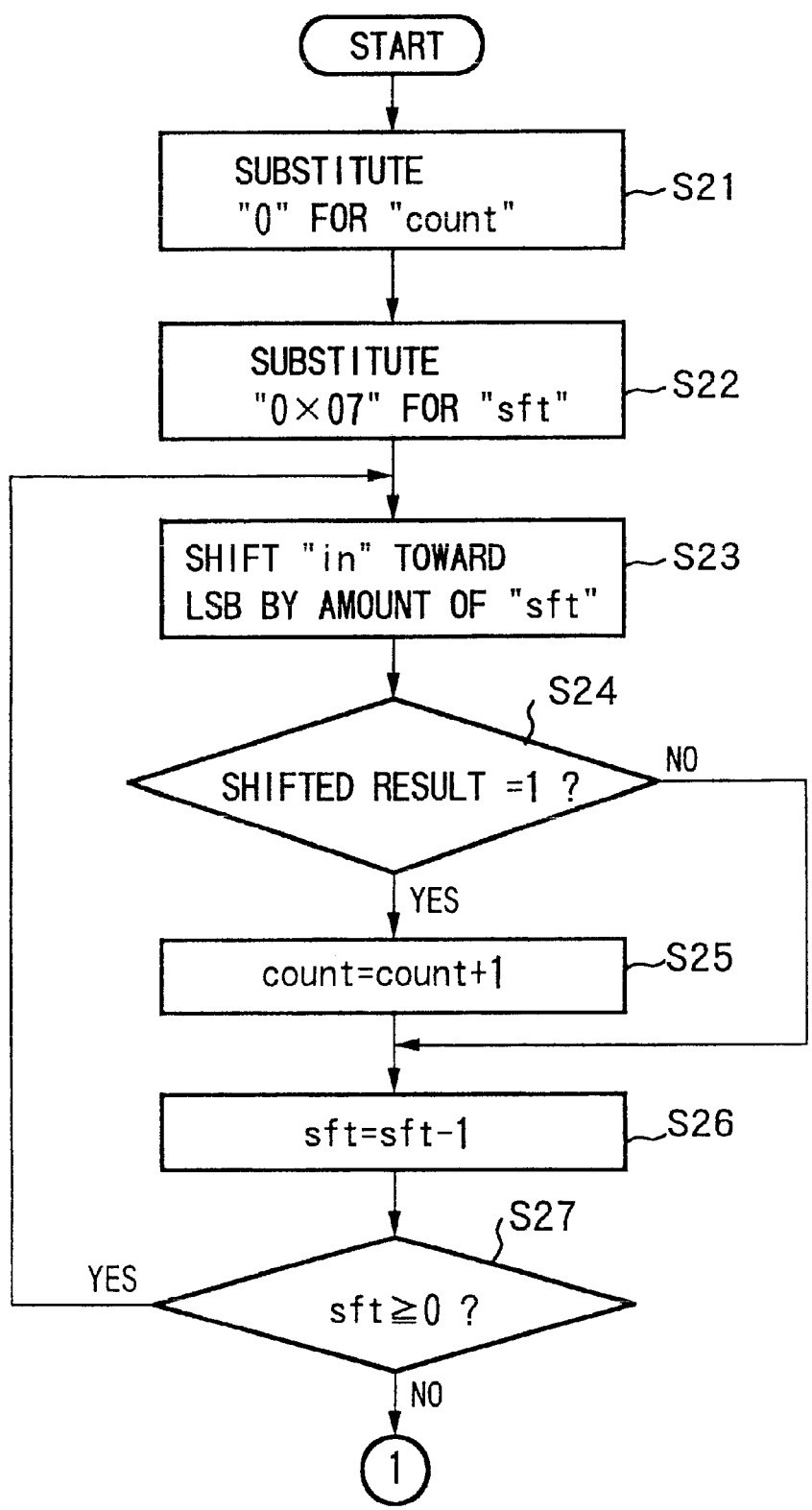
FIG. 3 is a flow chart of processing in the valid detector shown in FIG. 2.
Figure 4:
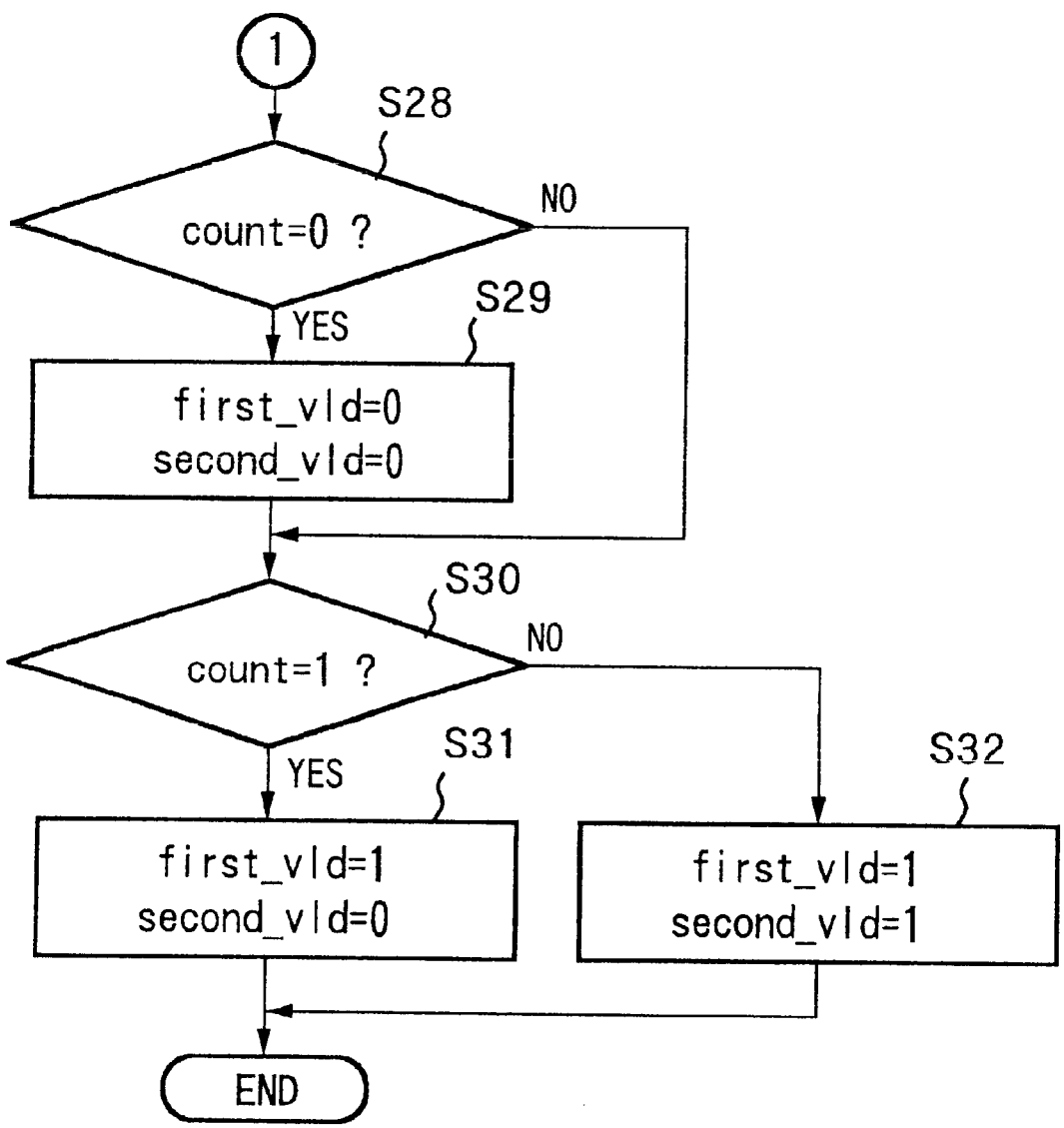
FIG. 4 is a flow chart of processing in the valid detector shown in FIG. 2.

FIGS. 3 and 4 are flow charts of the processing in the valid detector 102.

Step S21: The value "0" is substituted for the variable "count".

Step S22: The value "0×07", that is, the hexadecimal "07", is substituted for the variable "sft".

Step S23: "in", that is the upper 8 bits of the digital data 160, is shifted toward the LSB by exactly the amount of the variable "sft".

Step S24: It is judged whether or not the result of the shift at Step S23 is "1". When it is "1", the processing of Step S25 is carried out, while when it is not "1", the processing at Step S26 is carried out.

Step S25: The value "1" is added to the variable "count".

Step S26: The variable "sft" is reduced by "1".

Step S27: It is judged whether or not the variable "sft" is 0 or more. When it is 0 or more, the processing of Step S23 is carried out, while when not, the processing at Step S28 shown in FIG. 4 is carried out.

Step S28: It is judged whether or not the variable "count" is "0". When it is "0", the processing at Step S29 is carried out, while when not, the processing at Step S30 is carried out.

Step S29: This step is performed when the variable "count" is "0". The "first_vld" indicating "0" and the "second_vld" indicating "0" are output to the multiplexers 109 and 107, respectively.

Step S30: It is judged whether or not the variable "count" is "1". When it is "1", the processing at Step S31 is carried out, while when not, the processing at Step S32 is carried out.

Step S31: This step is performed when the variable "count" is "1". The "first_vld" indicating "1" and the "second_vld" indicating "0" are output to the multiplexers 109 and 107, respectively.

Step S32: This step is performed when the variable "count" is 2 or more. The "first_vld" indicating "1" and the "second_vld" indicating "1" are output to the multiplexers 109 and 107, respectively.

Note that the processing shown in FIGS. 3 and 4 is as shown in FIG. 5 when written in the C language.

[Priority Encoders 103 and 105]

The priority encoder 103 detects a first "1" bit seen from the MSB in the upper 8 bits of the digital data 160, generates 3-bit first bit encode data 180 indicating the position of the bit, and outputs the same to the multiplexer 109.

Figure 6:
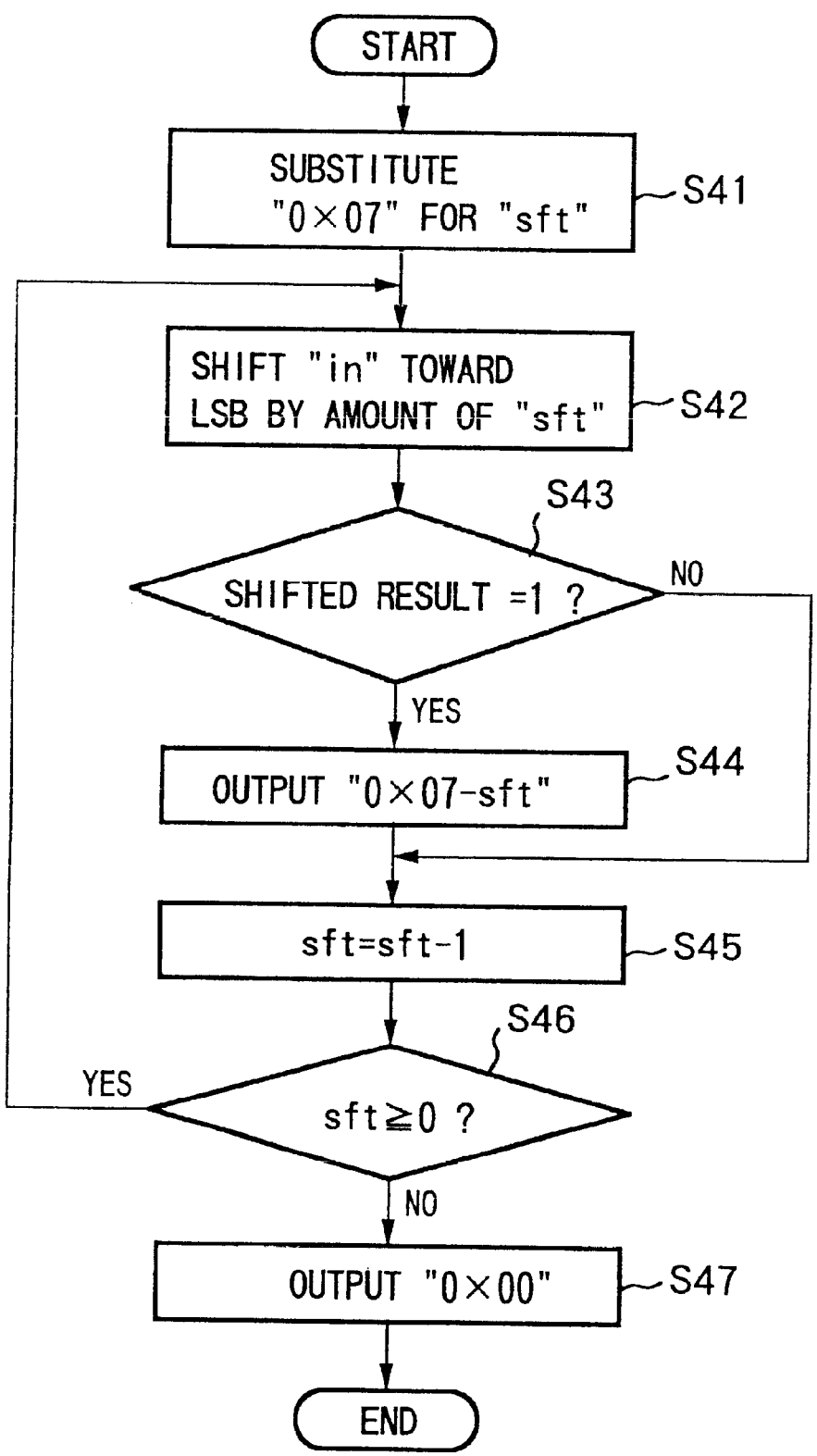
FIG. 6 is a flow chart of processing in the priority encoder in FIG. 2.

FIG. 6 is a flow chart of processing in the priority encoder 103 shown in FIG. 2.

Step S41: The value "0×07", that is, the hexadecimal "07", is substituted for the variable "sft".

Step S42: The upper 8 bits of the digital data 160 "in" are shifted toward the LSB by exactly the amount of the variable "sft".

Step S43: It is judged whether or not the result of the shift at Step S42 is "1". When it is "1", the processing of Step S44 is carried out, while it is not "1", the processing at Step S45 is carried out.

Step S44: The value "0×07−sft" obtained by subtracting the variable "sft" from "0×07", that is, the hexadecimal "07", is output to the multiplexer 109 as the first bit encode data 180.

Step S45: The variable "sft" is reduced by "1".

Step S46: It is judged whether or not the variable "sft" is 0 or more. When it is 0 or more, the processing of Step S42 is carried out again, while when not, the processing of Step S47 is carried out.

Step S47: the value "0×00" is output to the multiplexer 109 as the first bit encode data 180.

Note that the above processing shown in FIG. 6 is as shown in FIG. 7 when written in the C language.

The processing in the priority encoder 105 is the same as that in the above priority encoder 103 except that the processing is performed on the lower 8 bits of the digital data 160 and that the first bit encode data 182 of the processing result is output to the multiplexers 109 and 110.

[First Valid Bit Mask Units 104 and 106]

The first valid bit mask unit 104 generates first valid mask data 181 wherein the first "1" bit seen from the MSB in the upper 8 bits of the digital data 160 is masked, namely, is rewritten to be "0", and outputs the same to the multiplexer 107.

Figure 8:
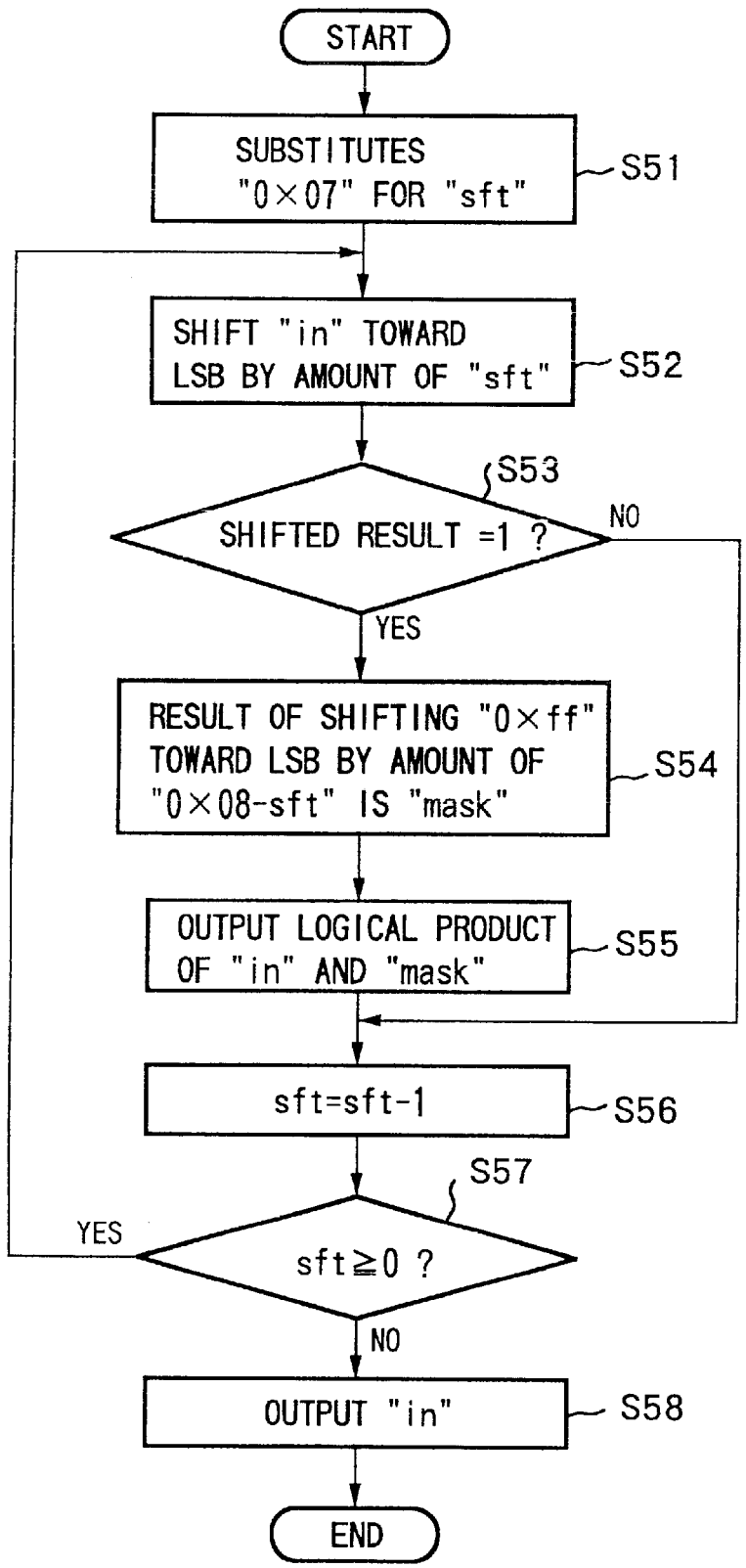
FIG. 8 is a flow chart of processing in the first valid bit mask unit shown in FIG. 2.

FIG. 8 is a flow chart of the processing in the first valid bit mask unit 104 shown in FIG. 2.

Step S51: The value "0×07", that is, the hexadecimal "07", is substituted for the variable "sft".

Step S52: The upper 8 bits of the digital data 160 "in" are shifted toward the LSB by exactly the amount of the variable "sft".

Step S53: It is judged whether or not the result of the shift at Step S52 is "1". When it is "1", the processing of Step S54 is carried out, while when it is not "1", the processing at Step S56 is carried out.

Step S54: The value "0×ff" is shifted toward the LSB by exactly the amount of "0×08−sft" obtained by subtracting "sft" from "0×08", that is, the hexadecimal "08". The result of the shift becomes a "mask".

Step S55: A logical product is calculated for the upper 8 bits of the digital data 160 "in" and the "mask" calculated at Step S54. The logical product is output to the multiplexer 107 shown in FIG. 2 as the first valid bit mask data 181.

Step S56: The variable "sft" is reduced by "1".

Step S57: It is judged whether or not the variable "sft" is 0 or more. When it is 0 or more, the processing of Step S52 is carried out, while when not, the processing of Step S58 is carried out.

Step S58: The upper 8 bits of the digital data 160 "in" are output to the multiplexer 107 as the first valid bit mask data 181.

Note that the processing shown in FIG. 8 is shown as in FIG. 9 when written in the C language.

The processing in the first valid bit mask unit 106 is the same as that of the above first valid bit mask unit 104 except that the processing is performed on the lower 8 bits of the digital data 160 and the processing result is output to the multiplexer 107 as the first valid bit mask data 183.

[Multiplexer 107]

The multiplexer 107 outputs the first valid bit mask data 183 from the first valid bit mask unit 106 to the 8-bit priority encoder 108 as first valid bit mask data 184 when the data second_vld is "0". On the other hand, the multiplexer 107 outputs the first valid bit mask data 181 from the first valid bit mask unit 104 to the 8-bit priority encoder 108 as the first valid bit mask data 184 when the second_vld is "1".

[Priority Encoder 108]

The 8-bit priority encoder 108 detects the first "1" bit seen from the MSB in the first valid bit mask data 184 from the multiplexer 107, generates 3-bit first bit encode data 185 indicating the position of the bit, and outputs the same to the multiplexer 110.

The processing of the 8-bit priority encoder 108 is basically the same as that of the above priority encoder 103 explained with reference to FIGS. 6 and 7.

[Multiplexer 109]

The multiplexer 109 outputs the first bit encode data 180 as first bit encode data 161 when the data first_vld is "1", while it outputs the first bit encode data 182 as the first bit encode data 161 when the data first_vld is "0".

[Multiplexer 110]

The multiplexer 110 outputs the first bit encode data 185 as the second bit encode data 162 when the data first_vld and the data second vld are the same values, it while outputs the first bit encode data 182 as the second bit encode data 162 when the data first_vld and the data second_vld a re different values.

Below, the overall operation of the FSPE encoder 100 shown in FIG. 2 will be explained.

Here, an explanation will be made of the case where the digital data 160 is "0100000000100001" as an example.

In this case, "01000000", which are the upper bits of "0100000000100000", are input to the valid detector 102, priority encoder 103, and first valid bit mask unit 104. The lower 8 bits "00100001" are input to the priority encoder 105 and the first valid bit mask unit 106.

Next, the processing explained below will be performed in parallel in the valid detector 102, the priority encoder 103, and the first valid bit mask unit 104.

Namely, the number of "1"s included in the upper 8 bits is detected to be one in the valid detector 102, and the "first_vld" indicating "1" and the "second_vld" indicating "0" are respectively output to the multiplexers 109 and 107.

Also, the priority encoder 103 detects the first bit, which is the first "1" bit seen from the MSB (the MSB is the 0th bit), in the upper 8 bits "01000000" and outputs the first bit encode data 180 indicating "1" to the multiplexer 109.

Also, the first valid bit mask data 181 indicating "0" is output from the first valid bit mask unit 104 to the multiplexer 107.

In parallel with the above processing on the upper 8 bits, the processing on the lower 8 bits "00100001" explained below is performed.

Namely, the priority encoder 105 detects the second bit, that is, the first "1" bit seen from the MSB (the MSB is the 0th bit), in the lower 8 bits "00100001". The first bit encode data 182 indicating "2" is output to the multiplexers 109 and 110.

In parallel with this, the first valid bit mask unit 106 outputs the first valid bit mask data 183 indicating "00000001" wherein the second bit of the lower 8 bits "00100001" is masked to the multiplexer 107.

Next, the multiplexer 107, based on the second_vld indicating "0", outputs the first valid bit mask data 183 indicating "00000001" to the 8-bit priority encoder 108 as the first valid bit mask data 184.

Next, the 8-bit priority encoder 108 encodes the first valid bit mask data 184 indicating "00000001" and outputs the first bit encode data 185 indicating "7" to the multiplexer 110.

Then, based on the first vld indicating "1", the first bit encode data 180 indicating "1" is output from the multiplexer 109 as the first bit encode data 161.

In the multiplexer 110, since the values of the data first_vld and second_vld are different, the first bit encode data 182 indicating "2" is output as the second bit encode data 162.

As explained above, according to the FSPE encoder 100 shown in FIG. 2, the 16-bit digital data 160 is divided into the upper bits and the lower bits and the 8-bit encode processing and the mask processing are performed in parallel for both of them.

In this FSPE encoder 100, the critical path which determines the processing time is a path of the first valid bit mask unit 104, the multiplexer 107, the 8-bit priority encoder 108, and the multiplexer 110.

Figure 10:
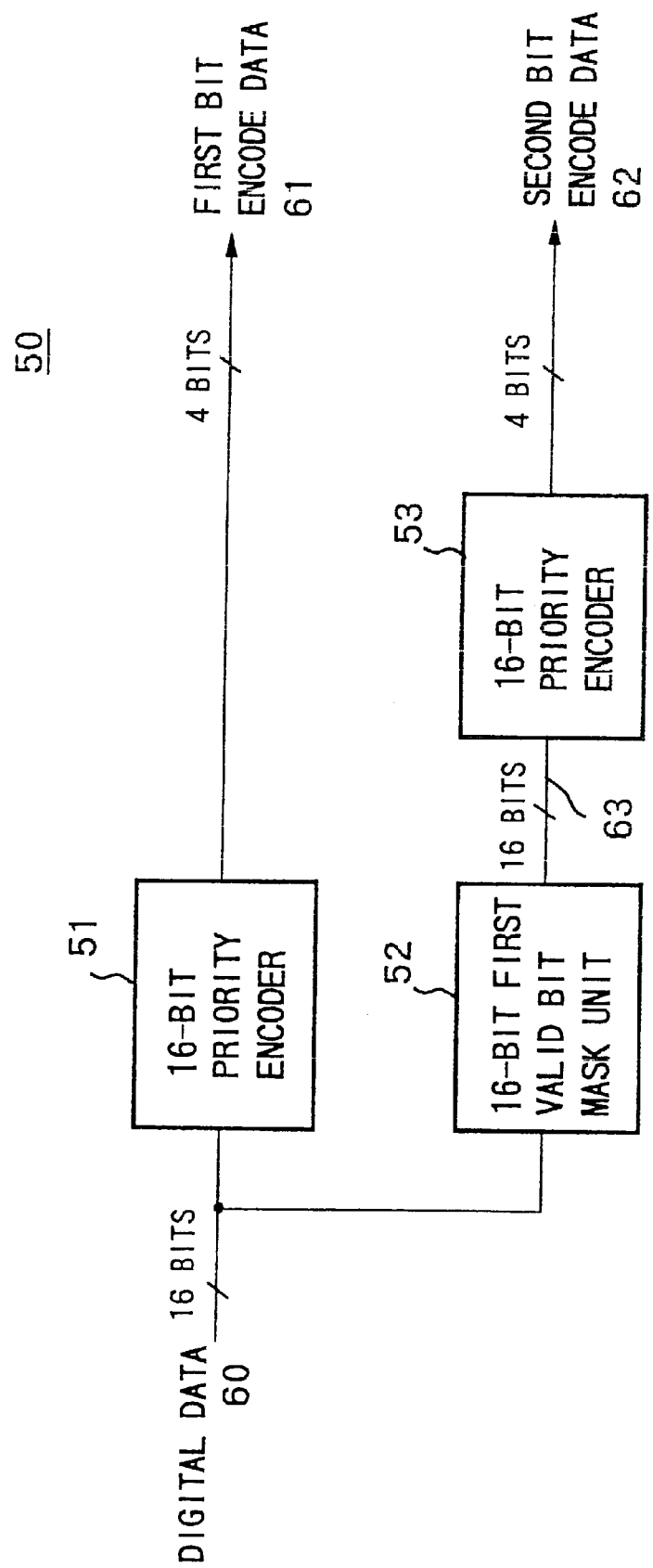
FIG. 10 is a view of the configuration of an FSPE encoder of the related art.
Figure 11:
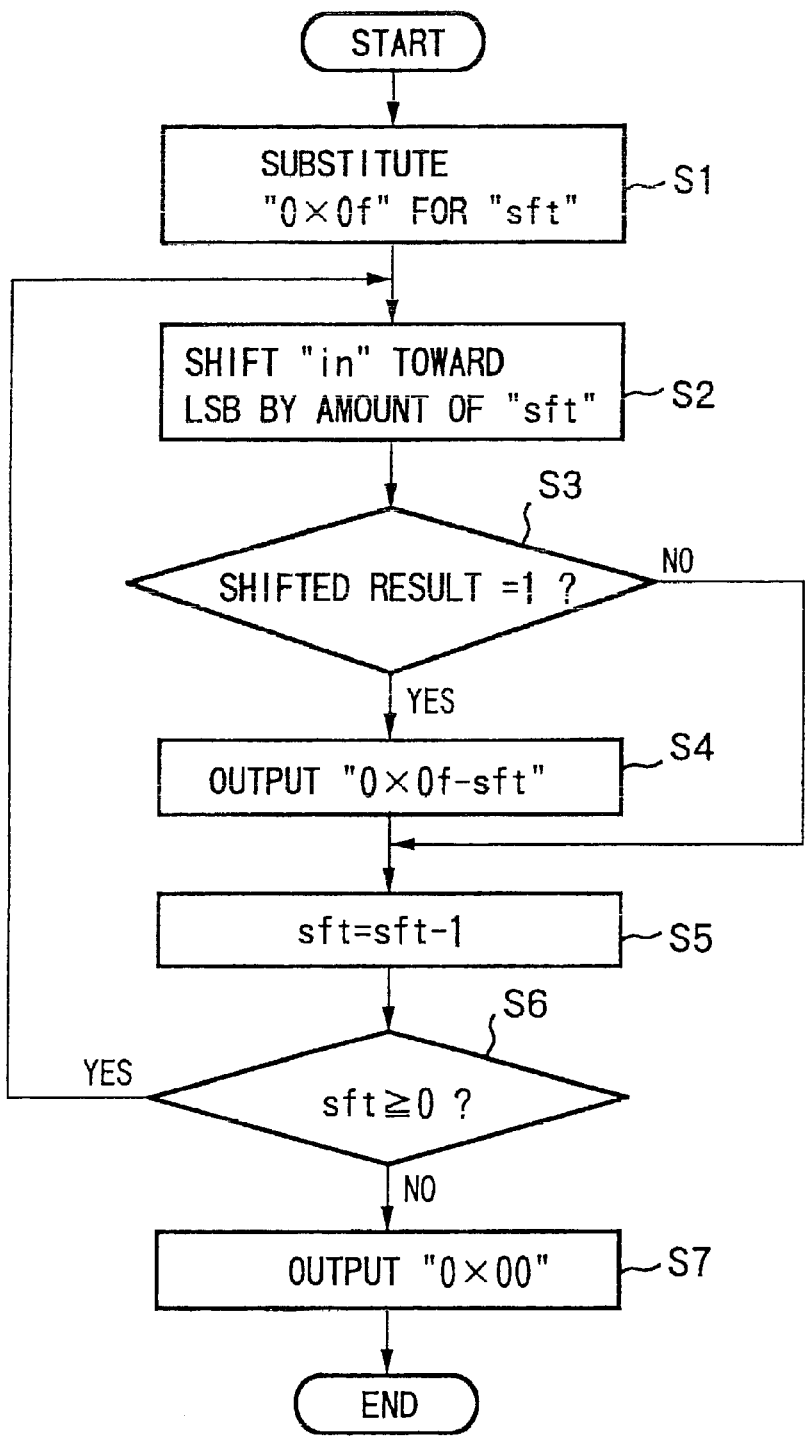
FIG. 11 is a flow chart of processing of the priority encoder in FIG. 10.
Figure 13:
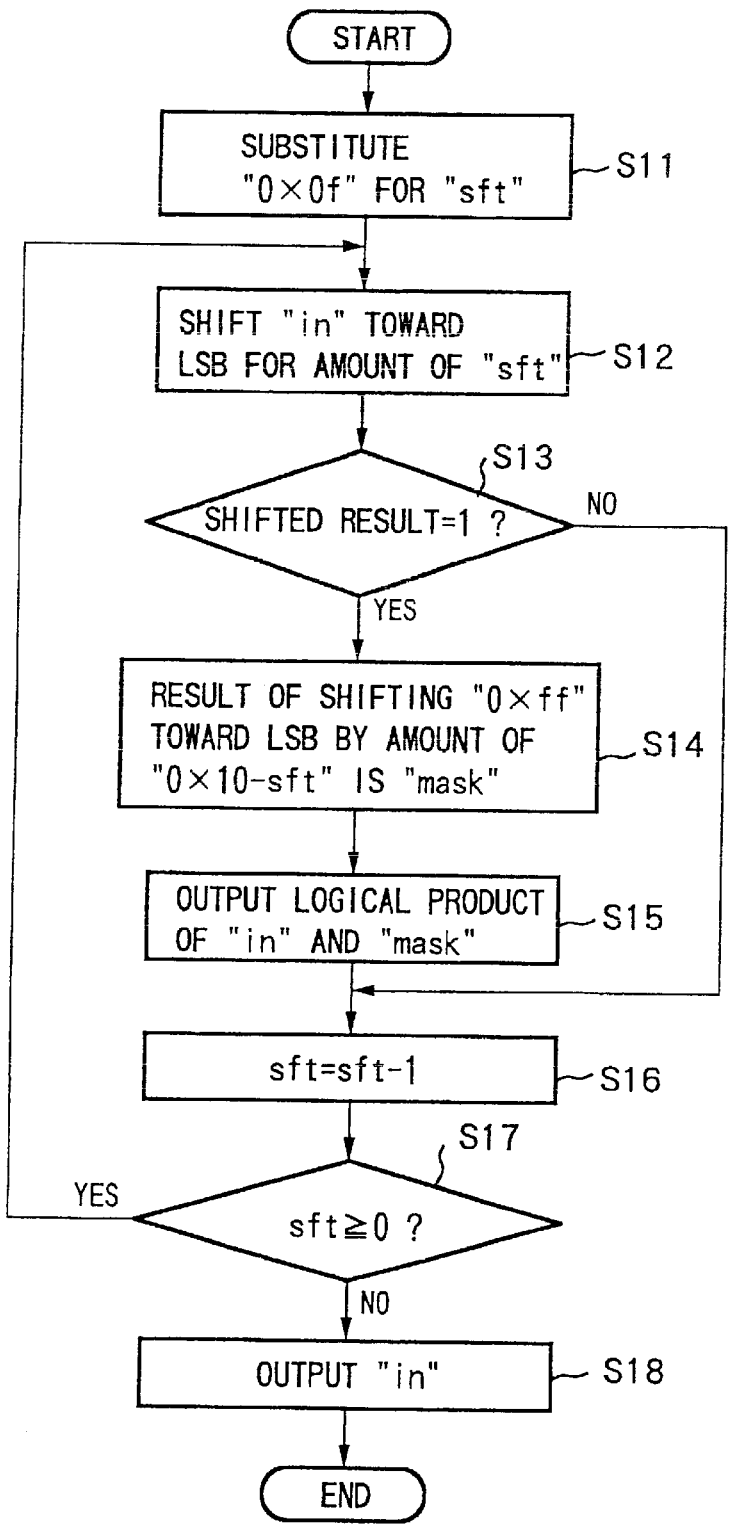
FIG. 13 is a flow chart of processing in the first valid bit mask unit shown in FIG. 10.

Here, the respective processing times of the 8 bits in the first valid bit mask unit 104 and the 8-bit priority encoder 108 are shorter than the processing of 16 bits in the first valid bit mask unit 52 and the priority encoder 53 shown in FIG. 10. Furthermore, since the processing time for switching of the multiplexers 107 and 110 can be ignored, the processing time can be shorter according to the FSPE encoder 100 shown in FIG. 2 when comparing with the FSPE encoder 50 shown in FIG. 10.

Also, according to the FSPE encoder 100, the circuit scale can be reduced compared with that of the FSPE encoder 50 of the related art.

The overall operation of the three-dimensional computer graphic system 1 will be explained below.

Polygon rendering data S4 is output from the main processor 4 to the DDA set-up circuit 10 via the main bus 6. Difference data S10 indicating the sides of the triangle and the difference in a horizontal direction etc. is generated in the DDA set-up circuit 10.

This difference data S10 is output to the triangle DDA circuit 11. In the triangle DDA circuit 11, the linearly interpolated data (z, R, G, B, α, s, t, q, F) for each pixel inside the triangle is calculated. Then, the calculated (z, R, G, B, α, s, t, q, F) data and the (x, y) data of the vertexes of the triangle are output from the triangle DDA circuit 11 to the texture engine circuit 12 as DDA data S11.

Next, the texture engine circuit 12 performs the operation for dividing the data s by the data q and the operation for dividing the data t by data q for the data (s, t, q) indicated by the DDA data S11.

At this time, the above FSPE encoder 100 shown in FIG. 2 operates in the division circuit.

Then, the texture sizes USIZE and VSIZE are respectively multiplied with the division results "s/q"and "t/q" to generate the texture coordinate data (u, v).

Next, a request for reading including the above generated texture coordinate data (u, v) is output from the texture engine circuit 12 to the SRAM 17 via the memory I/F circuit 13. Then, the data S17 (R, G, B, α) stored in the SRAM 17 is read via the memory I/F circuit 13.

Next, in the texture engine circuit 12, the data (R, G, B) in the read data S17 (R, G, B, α) and the (R, G, B) data included in the DDA data S11 from the triangle DDA circuit 11 in the former stage are blended by the ratio indicated by the α data (texture α) included in the data S17 (R, G, B, α) to generate the pixel data S12.

This pixel data S12 is output from the texture engine circuit 12 to the main memory I/F circuit 13.

Then, in the memory I/F circuit 13, the z-data corresponding to the pixel data input from the texture engine circuit 12 and the z-data stored in the z-buffer 22 are compared. When the image drawn by the input pixel data S12 is judged to be positioned closer to the viewing point than the image drawn in the display buffer the previous time, the z-data stored in the z-buffer 22 is updated by the z-data corresponding to the image data S12.

In the memory I/F circuit 13, in accordance with need, the (R, G, B) data included in the image data S12 and the (R, G, B) data already stored in the display buffer 21 are blended by the ratio indicated by the α data corresponding to the pixel data S12. Then the blended data (R, G, B) is written to the display buffer 21.

The present invention is not limited to the above embodiments.

For example, 16-bit data was explained as an example as the digital data 160 shown in FIG. 2 in the above embodiment, however, the number of bits of the digital data 160 is not specifically limited as far as it satisfies n (n≦2). Note that the larger the n is, the larger the effects becomes.

Also, in the above embodiment, a case of obtaining the bit position of the first "1" bit and the second "1"bit seen from the MSB in the digital data 160 was explained as an example. However, the present invention can be applied to a case of obtaining the bit positions of the first "0" bit and the second "0" bit seen from the MSB in the digital data 160 as well.

Furthermore, the present invention can be applied to obtain the first "1" bit and the second "1" bit seen from the LSB and to obtain the first "0" bit and the second "0" bit seen from the LSB in the digital data 160.

In this case, the lower 8 bits of the digital data 160 are input to the valid bit detector 102, the priority encoder 103, and the first valid bit mask unit 104 shown in FIG. 2, and the upper 8 bits of the digital data 160 are input to the priority encoder 105 and the first valid bit mask unit 106.

Then, at Step S41 shown in FIG. 6, the value "0×00" is substituted for the "sft", the "in" is shifted toward the MSB at Step S42, the shifted result is judged if it is "10000000" at Step S43, the "sft" is output at Step S44, the value "1" is added to the "sft" at Step S45, and the "sft" is judged if it is 7 or less at Step S46.

Also, the value "0×00" is substituted for the "sft" at Step S51 shown in FIG. 8, "in" is shifted toward the MSB at Step S52, the shifted result is judged if it is "10000000" or not at Step S53, the value obtained by shifting "0×ff" by the amount of the "sft" toward the MSB is output as "mask" at Step S54, the logical product of the "in" and the "mask" is output at Step S55, "1" is added to the "sft" at Step S56, and the "sft" is judged if it is 7 or less at Step S57.

In the above embodiment, a case where the FSPE encoder 100 shown in FIG. 2 was built in the division circuit of the texture engine circuit 12 was explained as an example. The FSPE encoder 100, however, can be used when judging to which bank of the display buffer the texture data read from the texture buffer 20 is to be written.

For example, in the above explained three-dimensional computer graphic system 1 shown in FIG. 1, the configuration using an SRAM 17 was explained as an example, however, the SRAM 17 may be omitted from the configuration.

Also, the texture buffer 20 and the texture CLUT buffer 23 shown in FIG. 1 may be provided outside the DRAM 16.

Further, in the three-dimensional computer graphic system 1 shown in FIG. 1, a case where the geometrical processing for generating the polygon rendering data was performed in the main processor 4 was explained as an example, but the processing may be performed in the rendering circuit 5 as well.

As explained above, according to the encoder and method of the same and the graphic processing apparatus of the present invention, the processing time can be made shorter.

Also, according to the encoder and the graphic processing apparatus of the present invention, the apparatus scale can be reduced.

While the invention has been described with reference to specific embodiment chosen for purpose of illustration, it should be apparent that numerous modifications could be made thereto by those skilled in the art without departing from the basic concept and scope of the invention.

What is claimed is:

1. An encoder for detecting a first bit located closest to a most significant bit (MSB) and a second bit located second-closest to the MSB among bits of a first level included in digital data of n bits (n is an integer not less than 2) and producing location information of said first bit and said second bit, comprising:

bit number detecting means for detecting the number of bits of said first level included in an upper n1 bits of said digital data;

first bit location information producing means for producing first bit location information which is location information of a bit located closest to the MSB among bits of the first level included in an upper n1 bits of said digital data;

first data masking means for producing digital data in which the level of the bit located closest to the MSB among bits of the first level included in upper n1 bits of said digital data is replaced with a second level;

second bit location information producing means for producing second bit location information which is location information of a bit located closest to the MSB among bits of a first level included in a lower n2 bits of said digital data;

second data masking means for producing digital data in which the level of the bit located closest to the MSB among bits of the first level included in lower n2 bits of said digital data is replaced with a second level;

selecting means for selecting one digital data among the digital data produced by said first data masking means and the digital data produced by said second data masking means on the basis of the detection result of said bit number detecting means;

third bit location information producing means for producing third bit location information which is location information of the bit located closest to the MSB among bits of the first level included in the digital data selected by said selecting means; and determining means for determining location information of said first bit and said second bit by using said first bit location information, said second bit location information, and said third bit location information on the basis of the result of the detection of said bit number detecting means.

2. An encoder as set forth in claim 1, wherein said selecting means selects the digital data produced by said first data masking means when the number of bits of the first level detected by said bit number detecting means is zero and selects the digital data produced by said second data masking means when the number of bits of the first level detected by said bit number detecting means is not zero.

3. An encoder as set forth in claim 1, wherein said determining means:

uses said second bit location information as the location information of said first bit and uses said third bit location information as the location information of said second bit when the number of bits of said first level detected by said bit number detecting means is zero;

uses said first bit location information as the location information of said first bit and uses said second bit location information as the location information of said second bit when the number of bits of said first level detected by said bit number detecting means is one; and uses said first bit location information as the location information of said first bit and uses said third bit location information as the location information of said second bit when the number of bits of said first level detected by said bit number detecting means is not less than 2.

4. An encoder as set forth in claim 1, wherein processes performed by said bit number detecting means, said first bit location information producing means, said first data masking means, said second bit location information producing means, and said second data masking means are performed in parallel.

5. An encoder as set forth in claim 1, wherein said upper n1 bits are the upper n/2 bits and said lower n2 bits are the lower n/2 bits.

6. An encoder for detecting a first bit located closest to a least significant bit (LSB) and a second bit located second-closest to the LSB among bits of a first level included in digital data of n bits (n is an integer not less than 2) and producing location information of said first bit and said second bit, comprising:

bit number detecting means for detecting the number of bits of said first level included in an upper n1 bits of said digital data;

first bit location information producing means for producing first bit location information which is location information of a bit located closest to the LSB among bits of the first level included in an upper n1 bits of said digital data;

first data masking means for producing digital data in which the level of the bit located closest to the LSB among bits of the first level included in the upper n1 bits of said digital data is replaced with a second level;

second bit location information producing means for producing second bit location information which is location information of a bit located closest to the LSB among bits of the first level included in a lower n2 bits of said digital data;

second data masking means for producing digital data in which the level of the bit located closest to the LSB among bits of the first level included in the lower n2 bits of said digital data is replaced with a second level;

selecting means for selecting one digital data among the digital data produced by said first data masking means and the digital data produced by said second data masking means on the basis of the detection result of said bit number detecting means;

third bit location information producing means for producing third bit location information which is location information of the bit located closest to the LSB among bits of the first level included in the digital data selected by said selecting means; and determining means for determining location information of said first bit and said second bit by using said first bit location information, said second bit location information, and said third bit location information on the basis of the result of the detection of said bit number detecting means.

7. An encoder as set forth in claim 6, wherein said selecting means selects the digital data produced by said first data masking means when the number of bits of the first level detected by said bit number detecting means is zero and selects the digital data produced by said second data masking means when the number of bits of the first level detected by said bit number detecting means is not zero.

8. An encoder as set forth in claim 6, wherein said determining means:

uses said second bit location information as the location information of said first bit and uses said third bit location information as the location information of said second bit when the number of bits of said first level detected by said bit number detecting means is zero;

uses said first bit location information as the location information of said first bit and uses said second bit location information as the location information of said second bit when the number of bits of said first level detected by said bit number detecting means is one; and uses said first bit location information as the location information of said first bit and uses said third bit location information as the location information of said second bit when the number of bits of said first level detected by said bit number detecting means is not less than 2.

9. An encoder as set forth in claim 6, wherein processes performed by said bit number detecting means, said first bit location information producing means, said first data masking means, said second bit location information producing means, and said second data masking means are performed in parallel.

10. An encoder as set forth in claim 6, wherein said upper n1 bits are upper n/2 bits and said lower n2 bits are lower n/2 bits.

11. A graphic processing apparatus wherein a three-dimensional model is expressed by a composite of unit graphics, texture data comprised of a plurality of pixel data indicating a pattern to be added to said unit graphics is read from an image memory, drawing data comprised of a plurality of pixel data is produced by setting said read texture data in correspondence with said unit graphics, and the drawing data is stored in said image memory, said graphic processing apparatus comprising:

polygon rendering data producing means for producing polygon rendering data including three-dimensional coordinates (x,y,z), red (R), green (G), and blue (B) data, homogeneous coordinates (s,t) and homogeneous-term q for vertexes of said unit graphics;

interpolation data generating means for interpolating polygon rendering data of said vertexes of said unit graphics to generate interpolated data of the pixels inside said unit graphics; and texture processing means for detecting a first bit located closest to a most significant bit (MSB) and a second bit located second-closest to the MSB among bits of a first level included in digital data of n bits (n is an integer not less than 2), including a division circuit embedding an encoder producing location information of said first bit and said second bit, dividing said homogeneous coordinates (s,t) included in said interpolated data by said homogeneous term q by using said division circuit, reading said texture data from said image memory by using texture address in accordance with the result of the division, and producing drawing data to be set in correspondence with said unit graphics, said division circuit comprising:

bit number detecting means for detecting the number of bits of said first level included in upper n1 bits of said digital data;

first bit location information producing means for producing first bit location information which is location information of a bit located closest to the MSB among bits of the first level included in an upper n1 bits of said digital data;

first data masking means for producing digital data in which the level of the bit located closest to the MSB among bits of the first level included in the upper n1 bits of said digital data is replaced with a second level;

second bit location information producing means for producing second bit location information which is location information of a bit located closest to the MSB among bits of the first level included in a lower n2 bits of said digital data;

second data masking means for producing digital data in which the level of the bit located closest to the MSB among bits of the first level included in the lower n2 bits of said digital data is replaced with a second level;

selecting means for selecting one digital data among the digital data produced by said first data masking means and the digital data produced by said second data masking means on the basis of the detection result of said bit number detecting means;

third bit location information producing means for producing third bit location information which is location information of the bit located closest to the MSB among bits of the first level included in the digital data selected by said selecting means; and determining means for determining location information of said first bit and said second bit by using said first bit location information, said second bit location information, and said third bit location information on the basis of the result of the detection of said bit number detecting means.

12. A graphic processing apparatus as set forth in claim 11, wherein said selecting means of said division circuit selects the digital data produced by said first data masking means when the number of bits of the first level detected by said bit number detecting means is zero and selects the digital data produced by said second data masking means when the number of bits of the first level detected by said bit number detecting means is not zero.

13. A graphic processing apparatus as set forth in claim 12, wherein said determining means of said division circuit:

uses said second bit location information as the location information of said first bit and uses said third bit location information as the location information of said second bit when the number of bits of said first level detected by said bit number detecting means is zero;

uses said first bit location information as the location information of said first bit and uses said second bit location information as the location information of said second bit when the number of bits of said first level detected by said bit number detecting means is one; and uses said first bit location information as the location information of said first bit and uses said third bit location information as the location information of said second bit when the number of bits of said first level detected by said bit number detecting means is not less than 2.

14. A graphic processing apparatus as set forth in claim 12, wherein processes performed by said bit number detecting means, said first bit location information producing means, said first data masking means, said second bit location information producing means, and said second data masking means are performed in parallel.

15. A graphic processing apparatus as set forth in claim 12, wherein said upper n1 bits are upper n/2 bits and said lower n2 bits are lower n/2 bits.

16. An encoding method detecting a first bit located closest to a most significant bit (MSB) and a second bit located second-closest to the MSB among bits of a first level included in a digital data of n bits (n is an integer not less than 2) and producing location information of said first bit and said second bit, the encoding method comprising the steps of:

detecting the number of bits of said first level included in an upper n1 bits of said digital data; producing first bit location information which is location information of a bit located closest to the MSB among bits of the first level included in the upper n1 bits of said digital data;

producing first mask digital data in which the level of the bit located closest to the MSB among bits of the first level included in the upper n1 bits of said digital data is replaced with a second level;

producing second bit location information which is location information of a bit located closest to the MSB among bits of the first level included in a lower n2 bits of said digital data;

producing a second mask digital data in which the level of the bit located closest to the MSB among bits of the first level included in the lower n2 bits of said digital data is replaced with a second level;

selecting one digital data among the digital data produced by said first data masking means and the digital data produced by said second data masking means on the basis of the detected number of bits; producing third bit location information which is location information of the bit located closest to the MSB among bits of the first level included in the selected digital data; and determining location information of said first bit and said second bit by using said first bit location information, said second bit location information, and said third bit location information on the basis of the detected number of bits.

17. An encoding method as set forth in claim 16, wherein the first mask digital data is selected when the detected number of bits is zero, and the second mask digital data is selected when the detected number of bits is not zero.

18. An encoding method as set forth in claim 17, wherein said second bit location information is used as the location information of said first bit and said third bit location information is used as the location information of said second bit when the detected number of bits is zero;

said first bit location information is used as the location information of said first bit and said second bit location information is used as the location information of said second bit when the detected number of bits is one; and said first bit location information is used as the location information of said first bit and said third bit location information is used as the location information of said second bit when the detected number of bits of is not less than 2.

19. An encoding method as set forth in claim 16, wherein processes of detecting the bit number, producing said first bit location information, producing said first mask digital data, producing second bit location information, and producing said second mask digital data are performed in parallel.

20. An encoding method as set forth in claim 16, wherein said upper n1 bits are upper n/2 bits and said lower n2 bits are lower n/2 bits.

21. An encoding method for detecting a first bit located closest to a least significant bit (LSB) and a second bit located second-closest to the LSB among bits of a first level included in digital data of n bits (n is an integer not less than 2) and producing location information of said first bit and said second bit, the encoding method comprising the steps of:

detecting the number of bits of said first level included in an upper n1 bits of said digital data;

producing first bit location information which is location information of a bit located closest to the LSB among bits of a first level included in the upper nil bits of said digital data;

producing first mask digital data in which the level of the bit located closest to the LSB among bits of a first level included in the upper n1 bits of said digital data is replaced with a second level;

producing second bit location information which is location information of the bit located closest to the LSB among bits of the first level included in a lower n2 bits of said digital data;

producing second mask digital data in which the level of the bit located closest to the LSB among bits of the first level included in the lower n2 bits of said digital data is replaced with a second level;

selecting one digital data among the digital data produced by said first data masking means and the digital data produced by said second data masking means on the basis of the detected number of bits;

producing third bit location information which is location information of the bit located closest to the LSB among bits of a first level included in the selected digital data; and determining location information of said first bit and said second bit by using said first bit location information, said second bit location information, and said third bit location information on the basis of the detected number of bits.

22. An encoding method as set forth in claim 21, wherein the first mask digital data is selected when the detected number of bits is zero, and the second mask digital data is selected when the detected number of bits is not zero.

23. An encoding method as set forth in claim 21, wherein said second bit location information is used as the location information of said first bit and said third bit location information is used as the location information of said second bit when the detected number of bits is zero;

said first bit location information is used as the location information of said first bit and said second bit location information is used as the location information of said second bit when the detected number of bits is one; and said first bit location information is used as the location information of said first bit and said third bit location information is used as the location information of said second bit when the detected number of bits of is not less than 2.

24. An encoding method as set forth in claim 21, wherein processes of detecting the bit number, of producing said first bit location information, of producing said first mask digital data, of producing second bit location information, and of producing said second mask digital data are performed in parallel.

25. An encoding method as set forth in claim 21, wherein said upper n1 bits are the upper n/2 bits and said lower n2 bits are the lower n/2 bits.

* * * * *

UNITED STATES PATENT AND TRADEMARK OFFICE
CERTIFICATE OF CORRECTION

PATENT NO.    : 6,329,999 B1
DATED         : December 11, 2001
INVENTOR(S)   : Tatsumi Mitsushita et al.

It is certified that error appears in the above-identified patent and that said Letters Patent is hereby corrected as shown below:

Column 22,
Line 51, replace "bits of is" with -- bits is --.

Column 23,
Line 5, replace "upper nil bits" with -- upper bits --.

Column 24,
Line 19, replace "bits of is" with -- bits is --.

Signed and Sealed this

Eleventh Day of November, 2003

JAMES E. ROGAN
*Director of the United States Patent and Trademark Office*